Sept. 12, 1944.    T. A. KEEN ET AL    2,358,168
TOTALIZING MACHINE
Filed April 27, 1940    7 Sheets-Sheet 4

INVENTORS
THOMAS A. KEEN
JAMES KILBURG
BY
Chas. E. Townsend.
ATTORNEY

Sept. 12, 1944.   T. A. KEEN ET AL   2,358,168
TOTALIZING MACHINE
Filed April 27, 1940   7 Sheets-Sheet 5
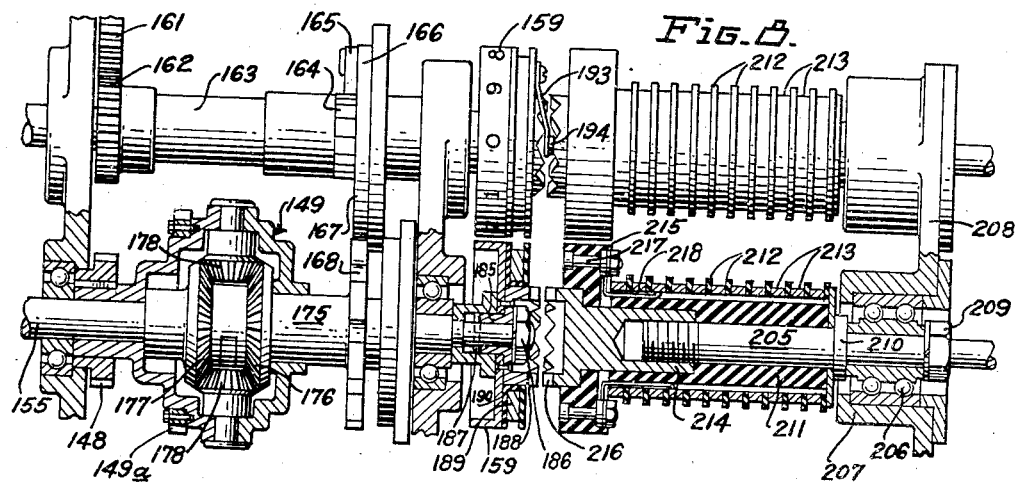
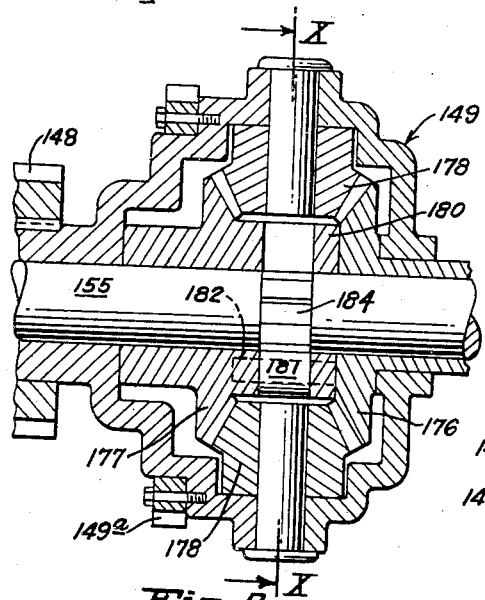
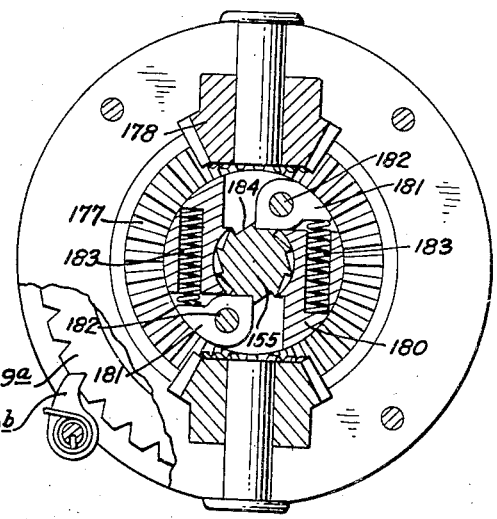
INVENTORS
THOMAS A. KEEN
JAMES KILBURG
BY Chas. E. Townsend.
ATTORNEY Sept. 12, 1944.　　T. A. KEEN ET AL　　2,358,168
TOTALIZING MACHINE
Filed April 27, 1940　　7 Sheets-Sheet 6
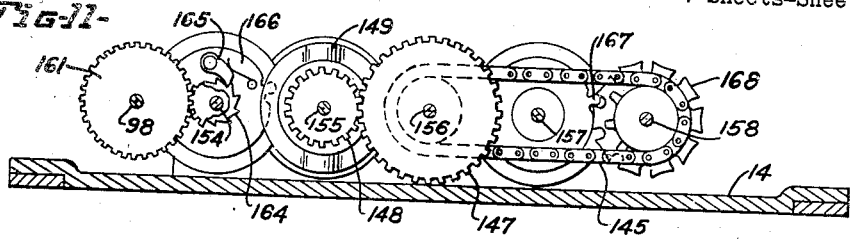
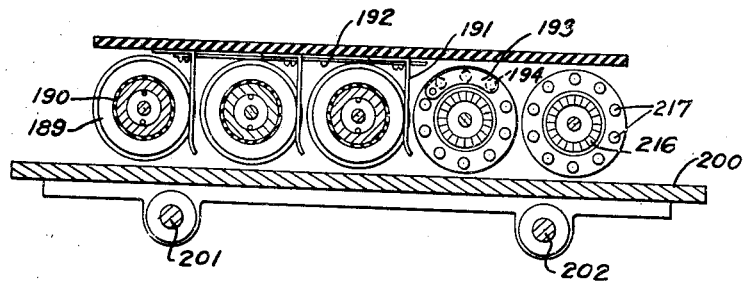
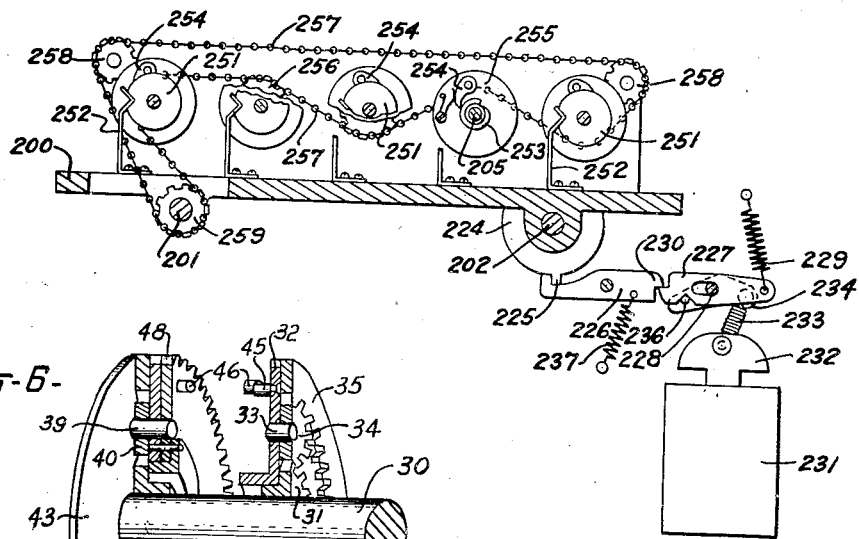
INVENTORS
THOMAS A. KEEN
JAMES KILBURG
BY Chas. E. Townsend
ATTORNEY

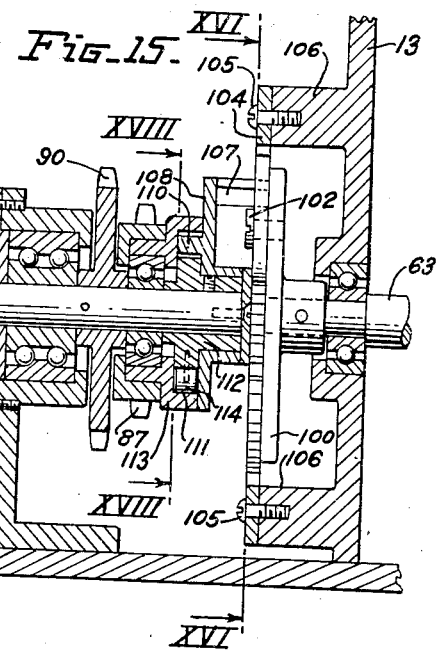
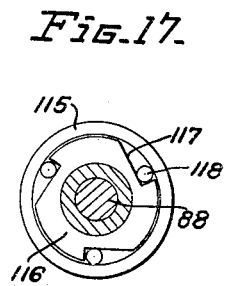
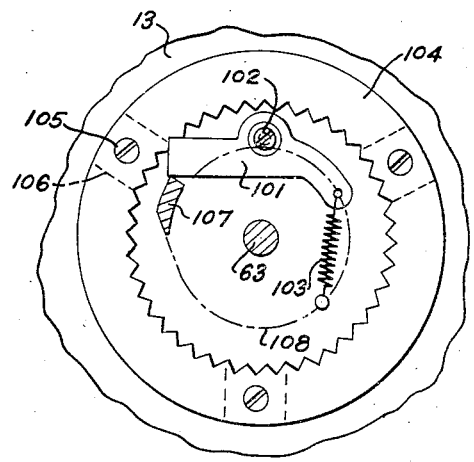
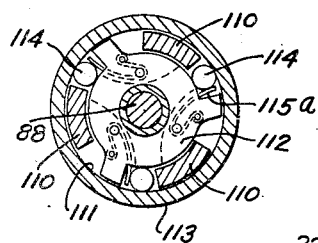
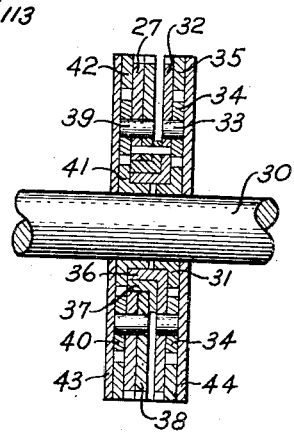

Patented Sept. 12, 1944

2,358,168

UNITED STATES PATENT OFFICE 2,358,168

TOTALIZING MACHINE

Thomas A. Keen, San Mateo, and James Kilburg, Redwood City, Calif.; said Kilburg assignor, by mesne assignments, to Hannah M. Smith, Chicago, Ill.

Application April 27, 1940, Serial No. 332,020

12 Claims. (Cl. 235—91)

This invention relates to totalizing machines, or more particularly stated, to a machine adapted to receive electric impulses initiated by operation of a plurality of other machines to register the number of impulses so received and, in turn, to initiate or transmit impulses from time to time which are indicative of the total of impulses registered and which may therefore be employed to effect a visible display, through suitable means, of figures which correspond to said total.

One use to which the present invention is particularly adapted is in connection with the sale and registration of tickets or chances under the so-called "pari-mutuel system," commonly used in race tracks, where bets are placed on various entries in a race and where the odds or percentage of winnings on any particular entry depend upon the ratio of the total sum wagered upon that entry, and the total sum wagered on all of the entries in the race, proper deductions having been made for profits, taxes, etc. As this is one of the more common uses for machines of this general character, it will in the present specification be referred to for the purpose of illustrating the invention and for clearly defining the mechanism and mechanical principles involved. It is, however, to be understood that reference to this particular use is made solely for illustrative purposes, and is not to be taken as limiting the invention to the use or to the specific structures employed in illustration thereof.

A brief discussion of some of the problems involved in the registration and totalization of ticket sales at an ordinary race track will facilitate an understanding of the function and operation of the machine of the present invention. There are usually ten or twelve entries in a race; patrons of the track wishing to place a bet on any one of these entries purchase tickets for the amount of the bet. These tickets, bearing data as to the value and the race and entry for which they are issued, are printed and issued at the time of purchase by machines provided for this purpose. Through these machines the issuance of each ticket initiates an electric impulse which is employed in registering the total sales of tickets for each entry and the total sales on all entries. From these totals the odds or percentage to be paid on the winning entry is determined. It is necessary, therefore, that a totalizing machine be employed for each entry, and another for the total sale on all entries. Furthermore, different classes of bets may be placed on an entry. These classes are usually three in number, namely, "Win," "Place," and "Show." As separate accounts must be kept for money bet on each entry and in each class, and separate totals registered for each class, the requirement for a race having twelve entries is thirty-nine separate totalizing machines. These machines may be of identical construction, and it is to one such machine that the present invention is directed.

For illustrative purposes, let it be assumed that the machine herein described is the totalizing machine for all entries in the "Win" classification. Its first function, then, is to receive impulses from all ticket printing machines in that classification, and to register in terms of dollars the total sales of said machines. This "Win" group of ticket issuing machines may comprise fifty or more machines divided into groups selling tickets of different values. For example, some will issue two dollar tickets, some five dollar tickets, and some ten dollar tickets. Each ticket issuing machine should have a capacity for issuing at least two tickets per second, so that the combined operation of said machines may exceed greatly the speed at which any conventional counting mechanism would operate to register total sales.

The registration of total sales, expressed in dollars, may be required to take place at a speed of hundreds per second. It is necessary to post the number which has been entered into the totalizing machine at frequent intervals for the information of patrons of the track, and it is the second important function of the totalizing machine to select and close electric circuits corresponding to the digits on its totalizing counters at any instant and, without interrupting the rapid operation of these counters, so that the total reading of the counters may be reflected or posted in large electrically lighted numerals on a field board provided for this purpose.

It is the object of the present invention to provide a totalizing machine adapted to perform the functions described above in a rapid, accurate, and efficient manner.

A further object is the provision in such a machine of what may be termed an impulse storage mechanism through which impulses to be counted may be received at various speeds and intervals and then transmitted to a counting mechanism at regular intervals and at a speed somewhat in excess of the greatest possible average speed of reception, thus insuring constant speed and smooth operation of the mechanism which effects the transmission to the counters.

A further object is the provision in such a machine of means to effect mechanical segregation of impulses representing different values, and to count said impulses in terms of value, and the combination with such means of means for transmitting low values and high values simultaneously to a counting mechanism while maintaining a relatively low speed of operation of the counters.

Further objects and advantages of the present invention will be made apparent in the following specification which, by reference to the accompanying drawings, constitutes a detailed description of a machine embodying the invention.

In the drawings—

Fig. 6 is a perspective view with parts separated and parts in section, of an impulse storage unit of the machine;

Fig. 7 is a central vertical section of the unit illustrated in Fig. 6;

Fig. 8 is an enlarged view in plan of a portion of the counter and transmission mechanisms shown in Fig. 1, with parts illustrated in section;

Fig. 9 is an enlarged central horizontal sectional view of a differential gearing mechanism illustrated in Fig. 8;

Fig. 10 is a section taken on line X—X of Fig. 9;

Fig. 11 is a view of the counter drive mechanism shown in Fig. 2 with parts broken away to show features of construction not disclosed in Fig. 2;

Fig. 12 is a view taken through the counter dials and transmitter units on the line XII—XII of Fig. 1;

Fig. 13 is a section taken on line XIII—XIII of Fig. 1;

Fig. 14 is a detailed plan view of the counter zeroizing clutch illustrated in Fig. 3;

Fig. 15 is a sectional view through a counter clutch and its operating mechanism taken on line XV—XV of Fig. 4;

Fig. 16 is a section taken on line XVI—XVI of Fig. 15;

Fig. 17 is a section taken on line XVII—XVII of Fig. 15;

Fig. 18 is a section taken on line XVIII—XVIII of Fig. 15; and

Fig. 19 is a central vertical section taken through a differential gearing employed in the transmission of impulses from the impulse storing mechanism to the counting mechanism.

Figure 1:
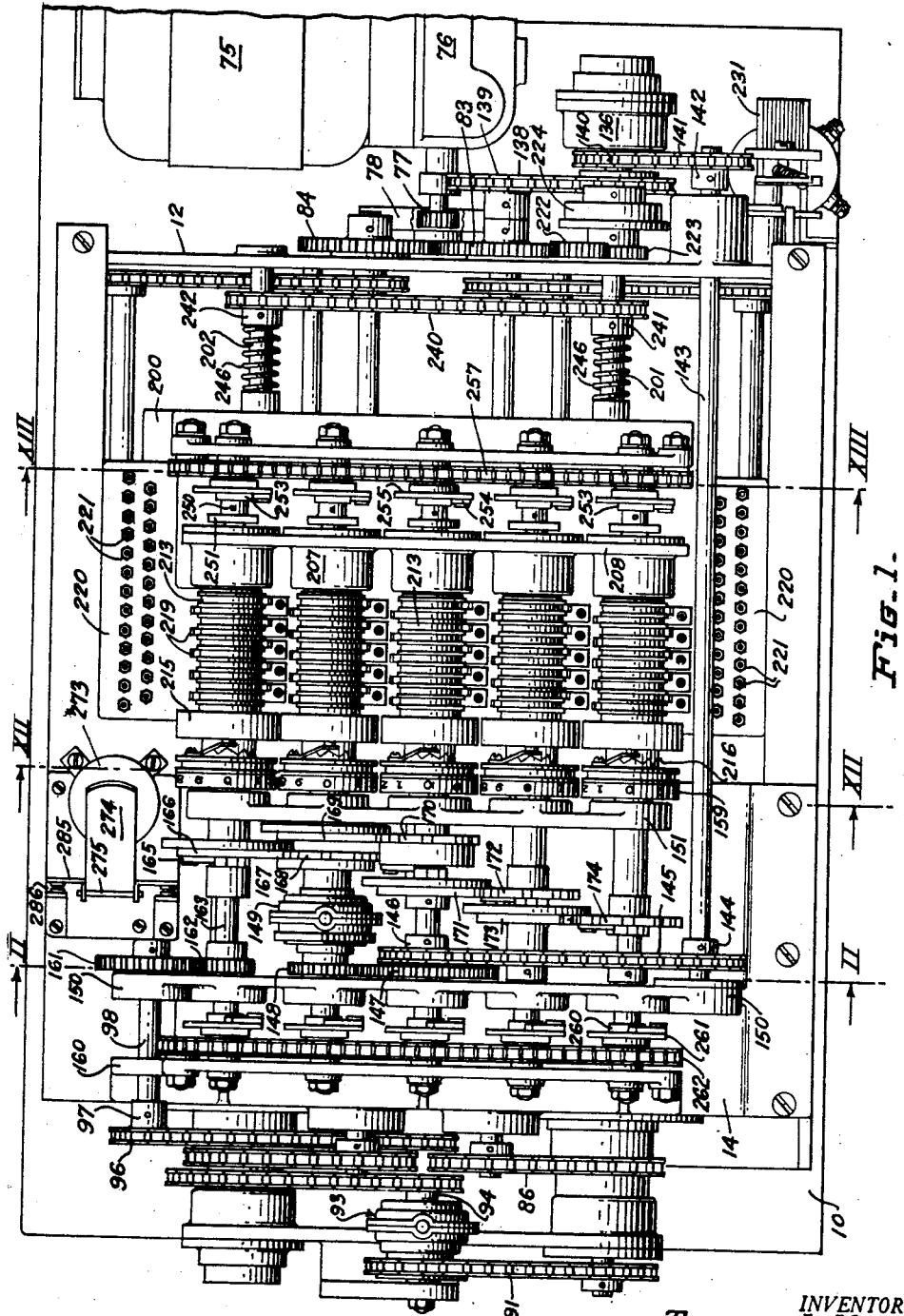
Fig. 1 is a plan view of a totalizing machine embodying the present invention.

As illustrated in Figs. 1 to 5 of the drawings, the machine in general is supported on a base plate 10 which is provided with downwardly extending peripheral flanges 11 by means of which the base plate is supported on a table or the like. Extending vertically upwardly from the base plate are a front plate 12 and a back plate 13, which serve as bearing supports for a plurality of longitudinally extending shafts, and also serve to support a platform 14 below which is positioned the main portion of the impulse receiving and storing mechanism, and above which is supported counting mechanism upon which the impulses received are eventually registered.

To preface a detailed description of the mechanism shown in the drawings, it is well to understand that the machine to be described is capable of receiving electric impulses from some fifty or more separate machines, such, for example, as the "Ticket printing and issuing machine," disclosed in our co-pending application filed August 7, 1939, Serial Number 288,840. While the machine disclosed in said co-pending application is one form of machine in connection with which the machine of the present application may be used, it is, however, to be understood that the operation of any type of machine capable of initiation of an electric impulse may be registered by the mechanism herein disclosed.

For illustration, the specification will refer to the machine as though it were connected by electric circuits with a plurality of such ticket printing and issuing machines in a manner to register and totalize all ticket sales from each machine, regardless of the particular entry upon which the ticket has been sold. For clarity, the various groups of mechanisms shown in the drawings will be described in detail under titles suggestive of their function.

*Impulse receiving and storing mechanism*

Figure 2:
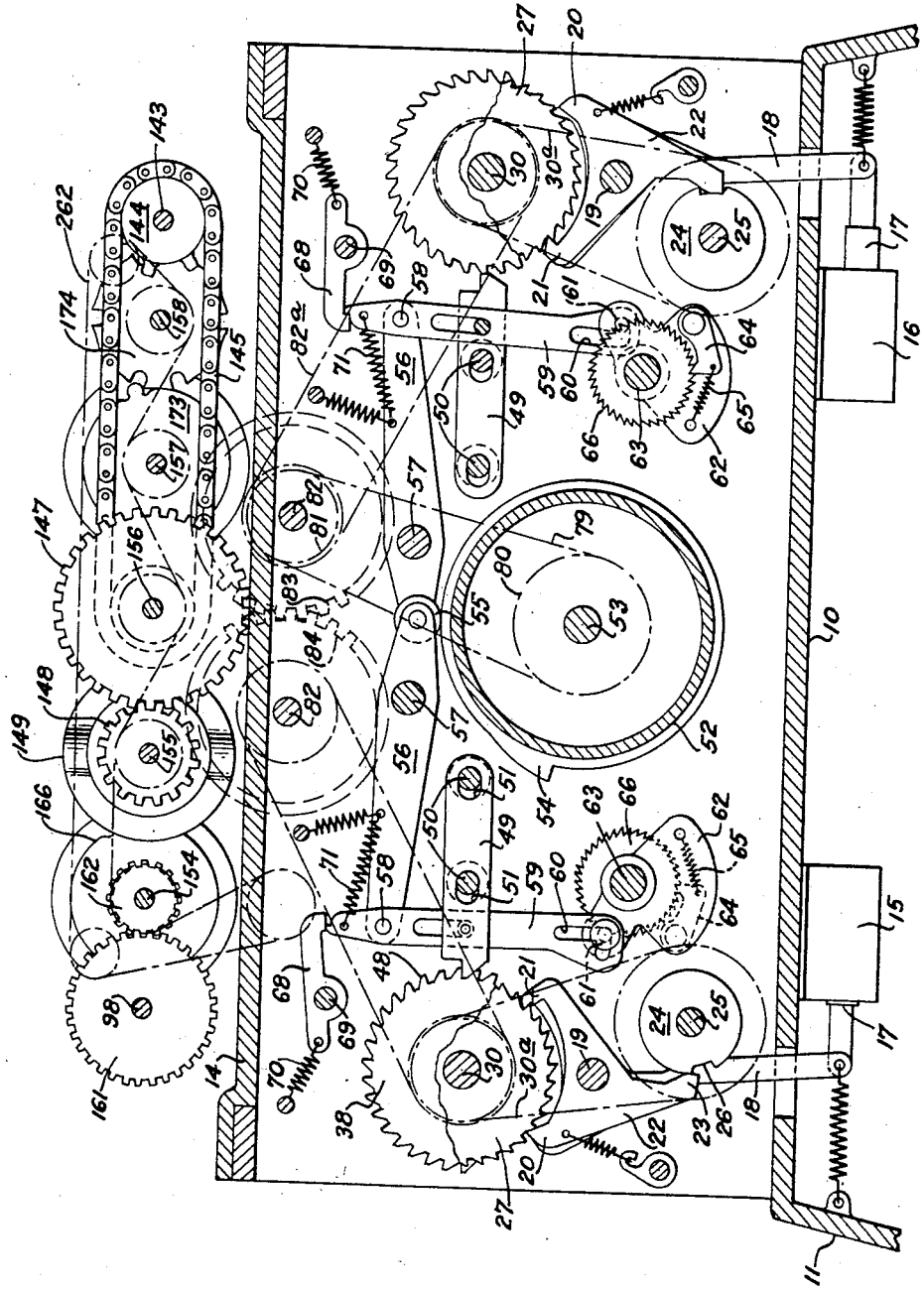
Fig. 2 is a vertical transverse sectional view taken on the line II—II of Fig. 1, with parts broken away to disclose the operation of other parts.
Figure 3:
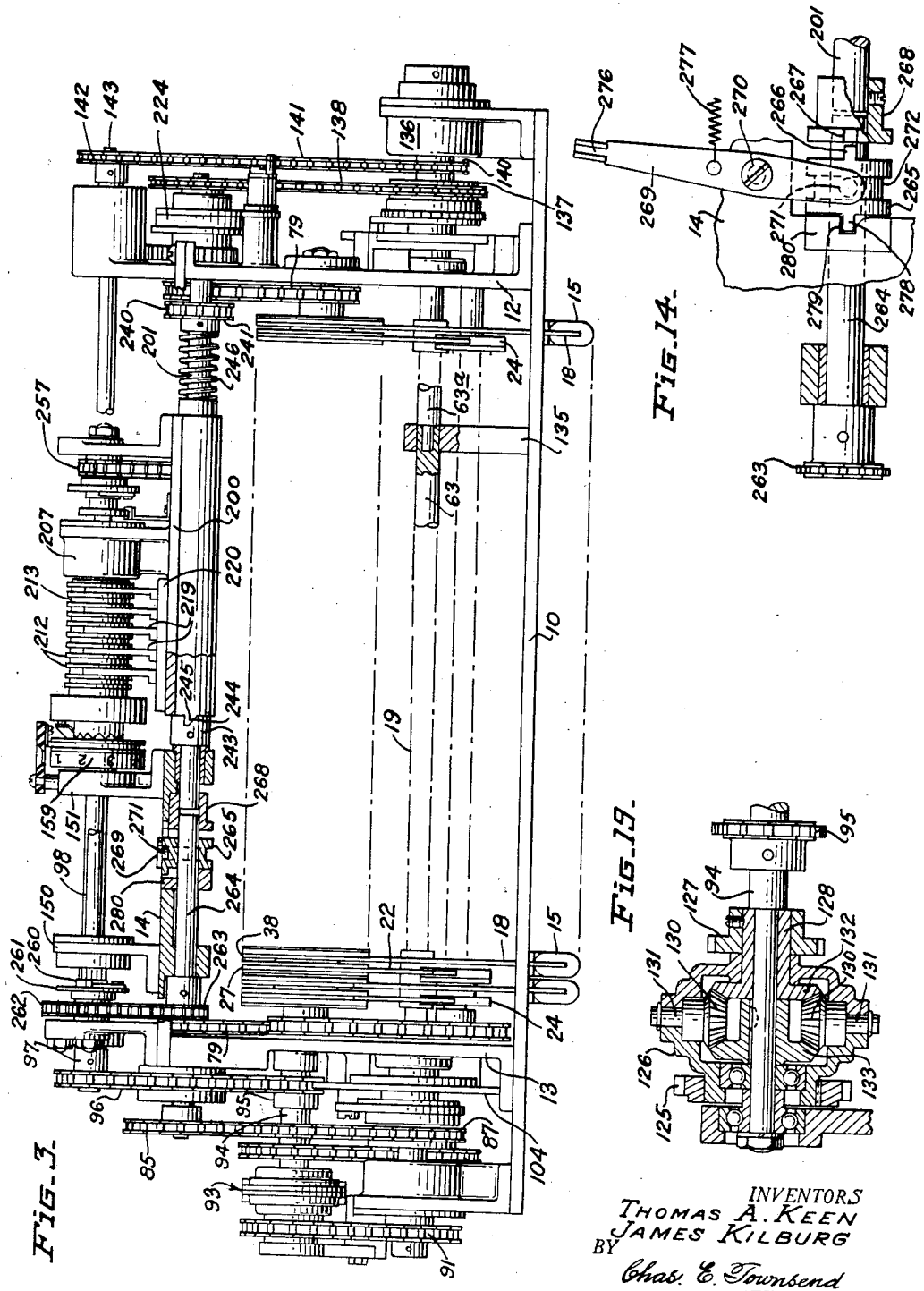
Fig. 3 is a side elevation of the machine illustrated in Fig. 1.

Referring to Figs. 2 and 3 of the drawings, two banks of solenoids are indicated at 15 and 16. Each of these solenoids is connected with a machine, the operation of which is to be registered by the totalizing machine by an electric circuit which transmits an impulse for each operation of the machine. The operation of the mechanism actuated by the solenoids 15 and 16 is identical, with a few exceptions that will be pointed out as the description proceeds, so the description of this operation will be directed to the mechanism associated with the solenoids 15.

Assuming that an impulse is received to energize one of the solenoids 15, an armature 17 thereof is retracted to oscillate an escapement lever 18 which is pivotally supported on a shaft 19 and which at its upper end has escapement teeth identical with those shown at 20 and 21 on a short escapement lever 22 pivoted on the same shaft 19. The lower end of the escapement lever 22 terminates in a toe 23 which rides on the periphery of a circular disc 24 fixed to a shaft 25 and having a notch 26 in its periphery, so that for each revolution of the disc 24 there is an opportunity for the escapement lever 22 to rock about the shaft 19 and permit advance movement of an escapement wheel 27 in a counter-clockwise direction, as viewed in Fig. 2. Whether the short escapement lever 22 rocks upon the opportunity presented by each rotation of the disc 24 depends upon whether an impulse has energized the solenoid 15 and rocked the escapement lever 18, as each time that the escapement lever 18 is energized, it permits an advance movement to take place in the impulse storing mechanism shown in Figs. 6 and 7, which mechanism includes the escapement wheel 27, and these advance movements, which may take place at various intervals of time and at varying rates of speed, are counted off by the escapement lever 22 at regular intervals due to the constant speed of rotation of the disc 24.

The impulse storing mechanism shown in Figs. 6 and 7 comprises a set of planetary gear assemblies which receive their motion from a constantly rotating shaft 30 by which they are supported. On the shaft 30 is keyed a sun gear 31 which has a laterally projecting hub, as shown, and which hub supports an escapement wheel 32 which is freely rotatable about the hub and which in turn carries journal pins 33 for a plurality, preferably four, planet gears 34 which mesh with the sun gear 31 and also mesh with an internally toothed ring gear 35. The escapement wheel 32 likewise has a laterally projecting hub 36 about which freely rotates a collar 37 to which are pinned a ratchet disc 38 and the escapement wheel 27, referred to above in the description of Fig. 2.

The ratchet disc 38 and escapement wheel 27 serve as supports for journal pins 39, similar to those shown at 33, and also support planet gears 40 meshing with a sun gear 41, also keyed to the shaft 30, and an internally toothed ring gear 42 identical in construction with the gear 35. Separator plates 43 and 44 are disposed on opposite sides of the impulse storing mechanism just described, so that a plurality of these mechanisms may conveniently be mounted side by side in close proximity to each other along the shaft 30.

As the shaft 30 rotates constantly, the sun gear 31, which is keyed to it, also rotates. The planet gears 34 must therefore rotate on their own axes or revolve with the shaft. As these planet gears are carried by pins 33 in the escapement wheel with which the escapement lever 18 engages, the planet gears will normally be unable to revolve with the shaft 30, and, being rotated on their own axes, will impart rotation to the ring gear 35 in the direction opposite to the shaft 30. The power necessary to rotate the ring gear 35, as well as the friction incident to rotation thereof, therefore establishes a constant torque, the counter-force of which tends to rotate the escapement wheel 32. A like force is at the same time tending to rotate the escapement wheel 27 in the same direction through the medium of the sun gear 31, planet gears 40, and ring gear 42. Rotation of the escapement wheel 32 is prevented by the escapement lever 18, so that operation of any of the several machines connected with the solenoid 15, which effects oscillation of the escapement lever 18, permits the escapement wheel 32 to advance a distance measured by the spacing of its teeth. The escapement wheel 32 carries a stop pin 45, and this pin registers with a similar pin 46 projecting from the escapement wheel 27, and normally prevents rotation of the escapement wheel 27.

If an impulse has admitted movement to the escapement wheel 32, the pin 45 will be advanced a distance corresponding to one tooth of the escapement wheel and a single forward movement of the escapement disc 27 will be permitted when the toe 23 of its escapement lever 22 drops into the notch 26 in the disc 24. If the impulses are received at a rate of speed exceeding the speed of rotation of the notched disc 24, they will be stored by this mechanism by advancing of the pin 45 a distance corresponding to the number of impulses received. Thus for each rotation of the disc 24 the escapement wheel 27 will be permitted to move forwardly one tooth at a time until all of the impulses have been counted by such movements and the pin 46 again strikes the pin 45.

Through the structure just described, very rapid and irregularly timed impulses initiated by machine operation and transmitted through the solenoid 15 may be received and stored and thereafter released and transferred to the counting mechanism, presently to be described, at regular intervals and by the smooth operation of mechanism which operates at constant speed.

*Motion transmitting mechanism*

Each movement of the escapement wheel 27, which movements are initiated indirectly by machine operations and therefore equal such operations in number, effects like movement of the ratchet disc 38, which is secured to the escapement wheel 27 as though it were a part thereof. This ratchet disc 38 is provided, as illustrated in Fig. 2, with peripheral ratchet teeth 48 corresponding in number with the teeth of the escapement wheel 27. Engaged with the ratchet teeth 48 for reciprocal operation thereby is a pawl 49 mounted for sliding movement on a pair of shafts 50 which extend transversely of the machine and are supported by the front and back plates 12 and 13, the pawl being provided with elongated slots 51 through which the shafts extend. Movement of the pawl 49 away from the teeth of the ratchet disc 38, such as will be effected by rotation of the ratchet disc, will result in a counting movement being transmitted to the counters of the totalizer. These counting movements are initiated by a cylindrical drum 52 extending transversely of the machine and rotated by a shaft 53 to which it is keyed and to which shaft is transmitted continuous rotary motion through the main drive transmission of the machine, as will hereinafter be set forth in detail.

The drum 52 carries a plurality of radially spaced peripherally projecting cams, typical of which is the one illustrated at 54 in Fig. 2. For each complete rotation of the drum 52, this cam 54 will strike an anti-friction roller 55 on the short end of a lever 56, which lever is pivotally supported on a shaft 57 extending through the machine, and also supported at its ends in the front and back plates 12 and 13. The long end of the lever 56 is pivoted as at 58 to a vertically reciprocable link 59. The lower end of the link 59 is provided with an L-shaped slot 60 through which passes a pin 61 carried by a pawl plate 62 which is supported by and free to oscillate on a shaft 63. A pawl 64 is pivoted to the pawl plate 62 and is biased by spring 65 into driving engagement with the teeth of a ratchet disc 66, which is also supported by and keyed to the shaft 63.

Through the mechanism just described, each complete rotation of the drum 52 produces a downward stroke of the link 59. If the link is in the position illustrated at the left side of Fig. 2, this downward stroke has no effect on the pawl plate 62, as the pin 61 on the pawl plate is received by the vertical portion of the L-shaped slot 60. In the event that an impulse has been received and counted out by the impulse storing mechanism, the motion of the ratchet disc 38 of such mechanism will have caused the pawl to move radially away from the disc, and this pawl being connected with the link 59 by a pin and slot connection 67 will have swung the link 59 about its pivot 58 so that it is lower and will have moved to a position with the pin 61 of the pawl plate being received by the horizontal portion of the L-shaped slot 60. This positions the parts as illustrated at the right-hand side of Fig. 2, and will result in oscillation of the pawl plate 62 by the downward movement of the link 59. This movement will be transmitted to the shaft 63 through the pawl 64 and ratchet disc 66.

The extent of this movement depends upon the height of the cam 54 on the drum 52, and, as the movement is eventually transmitted to the counting mechanism, the purpose of which is to register ticket sales in terms of dollars, the height of the cam 54 will depend upon the value of tickets sold in the ticket printing and issuing machine with which the mechanism just described is associated. For example, a low cam 54 will be used to impart rotation to the ratchet disc 66 a distance of two teeth, and this movement will effect registration of two units in the counting mechanism; and a high cam 54 will cause the disc 66 to be rotated a distance corresponding to five of its teeth, which will produce registration of five units in the counting mechanism. A still higher cam 54 could, of course, be used in registering the sale of tickets valued at ten dollars, but for the purpose of reducing the operating speed of the mechanism, the present invention provides for the registration of ten-dollar ticket sales through smaller cams designed to move the ratchet disc 66 a distance corresponding to a single tooth, and mechanism is then provided to transmit this motion directly to the tens dial of the counter mechanism rather than to the units dial thereof which receives the two-dollar and five-dollar movements directly.

The rotation of the ratchet disc 38 by the impulse storing mechanism occurs prior in time with relation to the cyclic operation of the machine to the downward movement of the link 59, so in order that the link be held in its operating position as illustrated at the right-hand side of Fig. 2 until it moves downwardly, a latch 68 is pivoted on a shaft 69 engageable with the uppermost end of the link 59 when it is swung into its motion transmitting position. A spring 70 urges the latch 68 downwardly for this purpose, and as the link 59 moves downwardly, it releases itself from the latch but is retained in its operating position by frictional engagement between the pin 61 on the pawl plate 62 and the horizontal portion of the slot 60. This friction is relieved during upward or return movement of the link 59, and the link is swung to its idle position by the tension of a spring 71 connecting the upper end of the link with the lever 56.

Now it is to be understood that the impulse storing mechanisms and the mechanism for receiving and transmitting motion therefrom to the shaft 63, as just described, are provided in numbers corresponding to the number of ticket printing and issuing machines, or other machines, associated with the totalizing machine. Consequently, there is a separate solenoid 15 or 16 for each ticket printing and issuing machine, and the actuation of any one of these solenoids by such a machine will be transmitted through a separate mechanism identical with that above described. The solenoids 15 and 16 are arranged in two banks, and the remaining portions of the mechanism are duplicated on opposite sides of the drum 52 for the purpose of space conservation and to simplify segregation or timing of impulses which, through structure to be described, may be received and transmitted to the counting mechanism two at a time.

*Motor-drive mechanism*

Figure 4:
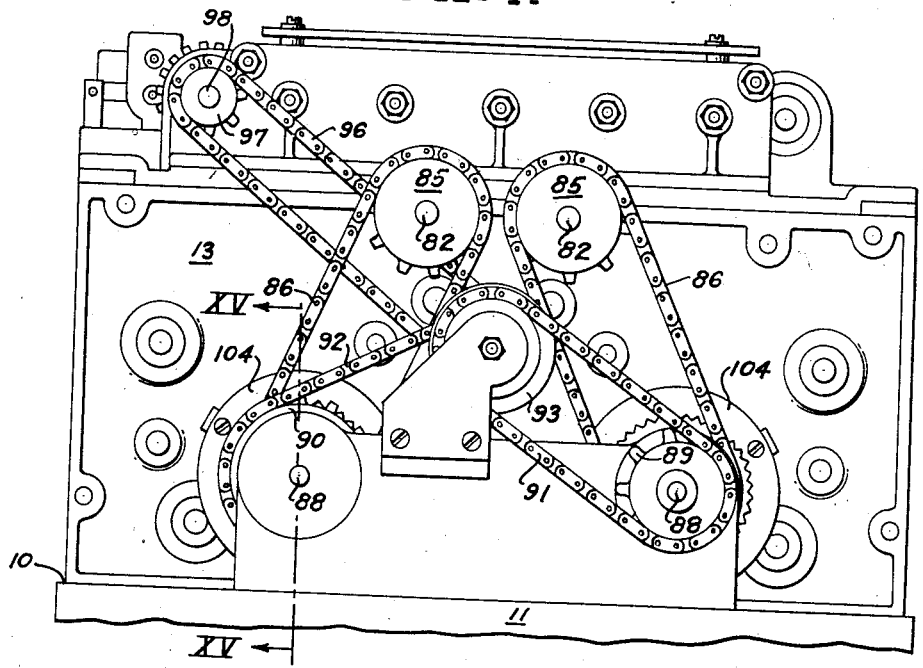
Fig. 4 is a rear elevation of said machine.

Each time either one of the shafts 63 is rotated, the counting mechanism is advanced, through a main source of power which is shown in the form of an electric motor 75 (see Figs. 1 and 5), which operates through a suitable reduction gearing contained in the housing 76 to drive a pinion 77 which meshes with an internal ring gear 78 secured to the end of the shaft 53 upon which the drum 52 is mounted. This motor is positioned adjacent the front end of the machine. Toward the rear end of the machine, that is, between the rear of the drum 52 and the back plate 13, a chain 79, indicated in broken lines in Fig. 2, and also shown in Fig. 3, imparts movement from a sprocket 80 on the shaft 53 to a sprocket 81 on one of a pair of main drive shafts 82, which drive shafts are connected for rotation in opposite directions by gears 83 and 84. Chains 82a connect the shafts 82 with the shafts 30, and chains 30a connect the shafts 30 with the shafts 25 so that the shafts 25 and 30 are constantly driven. The outer ends of the drive shafts 82 in the rear of the machine, as shown in Fig. 4, carry identical sprockets 85 which, through chains 86, transmit motion to sprockets 87 on the freely rotating drive members of clutches, the structure of which is shown in Figs. 15 and 16.

The driven members of these clutches are keyed to stub shafts 88 at the outer ends of which are fixed sprockets 89 and 90, which, through chains 91 and 92 respectively transmit motion through a differential gearing, generally indicated at 93, to a shaft 94 (see Fig. 3) which, through a sprocket 95 and chain 96, drive a sprocket 97 fixed to the outer end of a shaft 98 through which the units order of the counting mechanism receives its motion.

The stub shafts 88 which support the clutches above referred to are axially aligned with the shafts 63 shown in Fig. 2, which are rotated as the result of impulses received from ticket printing and issuing machines. For each rotation or partial rotation of either of the shafts 63 its associated clutch is engaged to impart identical rotation to its stub shaft 88 and hence to the counting mechanism through the differential gearing 93. This clutch engagement is effected through the structure shown in detail in Figs. 15 and 16, wherein the rear end of one of the shafts 63, both being identical, is shown as fitted with a pawl disc 100 exteriorly of the back plate 13 through which the shaft projects. This pawl disc 100 carries a pawl 101 which is pivoted to the disc by a screw 102, and the outer end of which is urged outwardly by a spring 103, anchored between the disc 100 and the tail of the pawl, into engagement with an internally toothed annular ratchet ring 104. This ratchet ring, which is stationary, is secured in spaced relation to the outer face of the back plate 13 by means of screws 105 passing through perforations in the ring and entering lugs 106 cast integrally with the plate 13.

The teeth of the ratchet ring 104 are of the same number as the teeth on the ratchet disc 66, there being forty teeth on each, so that for every rotation of the shaft 63 a distance corresponding to a certain number of teeth on the ratchet disc 66, the pawl 101 is advanced over the same number of teeth on the ratchet ring 104. This pawl controls the operation of the clutch which drives the stub shaft 88, as a clutch control finger 107 engages and follows the pawl 101 to effect clutch engagement and driving of the stub shaft 88 to correspond to the movement of the shaft 63, although rotation of the stub shaft 88 may lag slightly behind that of the shaft 63. This clutch control finger 107 is a part of a clutch control disc 108 which is rotatable with the stub shaft 88 and which has laterally projecting arcuate lugs 110 extending into roller chambers 111 which are formed in the periphery of a clutch driven member 112 secured to the stub shaft 88 and surrounded by a clutch driving member 113 to which is secured the sprocket 87. Upon rotation of the member 113 the rollers 114 in the chambers 111 are wedged to engage and drive the driven member 112 and thus the stub shaft 88. Springs 115a engage the rollers 114 to urge them into their wedged or clutching position. In engaged position of the clutch, the plate 108 rotates with the driving member 113 and the driven member 112. Hence any stopping of the plate 108, as by engagement of its control finger 107 with the pawl 101, causes the rollers to engage with the lugs 110 and to become dislodged from their wedged or driving position so that the driven member 112 and stub shaft 88 come to rest. This type of clutch has been found particularly well adapted to this use, as its extreme sensitivity makes it possible for the driven member to be moved exactly the same distance as the movement of the clutch finger 107, which finger is permitted to advance step by step by the pawl 101, each step being but one-fortieth of a complete rotation. While the driven member is in its position of rest, any tendency for it to move in reverse, which might result from the tension of the springs 70 and 71, will be overcome by the over-riding clutch associated with the stub shaft 88 and comprising a stationary drum-shaped housing 115 which receives a peripherally notched rotor 116 secured to the stub shaft 88. The notches 117 of this rotor contain rollers or balls 118 which, due to the shape of the notches, jam against the inner periphery of the drum 115 upon attempted reverse rotation of the stub shaft 88, but permit free rotation thereof in a forward direction. A cover plate 119 retains the balls 118 within their respective notches and is held in place by a set screw 120 which passes through and also secures the rotor 116 to the shaft 88.

Thus rotation of the stub shafts 88 corresponding to rotation of the respective shafts 63 is transmitted through the chains 91 and 92 to the differential gearing generally indicated at 93 and shown in detail in Fig. 19.

The chain 91 drives a sprocket 125 which is fixed to the housing 126 of the differential gearing 93. The chain 92 drives a sprocket 127 which is fixed to a bushing 128 for rotation on a shaft 94 which serves as a support for the differential gearing. When the gear 125 is rotated it carries with it the differential housing 126 to which it is fixed and the small bevel gears 130 carried on pins 131 in the housing are caused to travel on a large bevel gear 132 which is fixed to the bushing 128. As this bevel gear 132 is not rotating, the travel of the small gears 130 therearound imparts rotation to another large bevel gear 133 which is fixed to the shaft 94. As the housing 126 and bevel gear 133 are both being rotated, the shaft 94 receives two complete rotations for each rotation of the sprocket 125. On the other hand, when the sprocket 127 is rotated, it carries with it the large bevel gear 132 and through the small gears 130 imparts rotation to the large bevel gear 133 and the shaft 94 at a one-to-one ratio. As the sprocket 125 is just twice the size of the sprocket 127, the variation in ratio of movement between the sprockets and the shaft 94 is compensated. As a result of this differential gearing, any motion of either of the two stub shafts 88 is transmitted to the shaft 94 and the motion of the two shafts 88 is accumulated in the shaft 94 regardless of whether the shafts 88 move in unison or alternately. The shaft 94 carries the sprocket 95 which, as heretofore described, drives the shaft 98 (see Fig. 1) through chain 96 and sprocket 97 from which the units order of the counting mechanism receives its motion.

Before proceeding with a detailed description of the operation of the counting mechanism, it is well to recall that the two-dollar and five-dollar impulses are to be entered into the counting mechanism through the units order, while the impulses representing the sale of ten-dollar tickets will be entered into the same counting mechanism directly through the tens order thereof. Digression is made at this point, therefore, to describe the manner in which motion resulting from impulses received from machines selling ten-dollar tickets is transmitted to the counting mechanism.

Referring back to Figs. 2 and 3, and recalling that energization of any one of the solenoids 15 or 16 would produce rotation of one of the shafts 63 to a degree depending upon the height of the cam 54 on the drum 52 and associated with the particular solenoid, mention was made of the fact that the sale of a ten-dollar ticket could be registered by a cam 54 of a height which will result in rotation of the shaft 63 the space of one tooth on the ratchet 66. To accomplish this, one of the shafts 63 is broken intermediate its ends to form an independently rotatable axially aligned shaft 63a (see Fig. 3) upon which are mounted all of the ratchet discs 66 which receive motion as the result of the sale of ten-dollar tickets and which, due to the height of their respective cams 54 on the drum 52, are moved but a single tooth for each ten dollar impulse received by the solenoid with which they are associated. At their point of separation the shafts 63 and 63a (shown in Fig. 3) are supported in suitable bearings carried by a bearing bracket 135.

Figure 5:
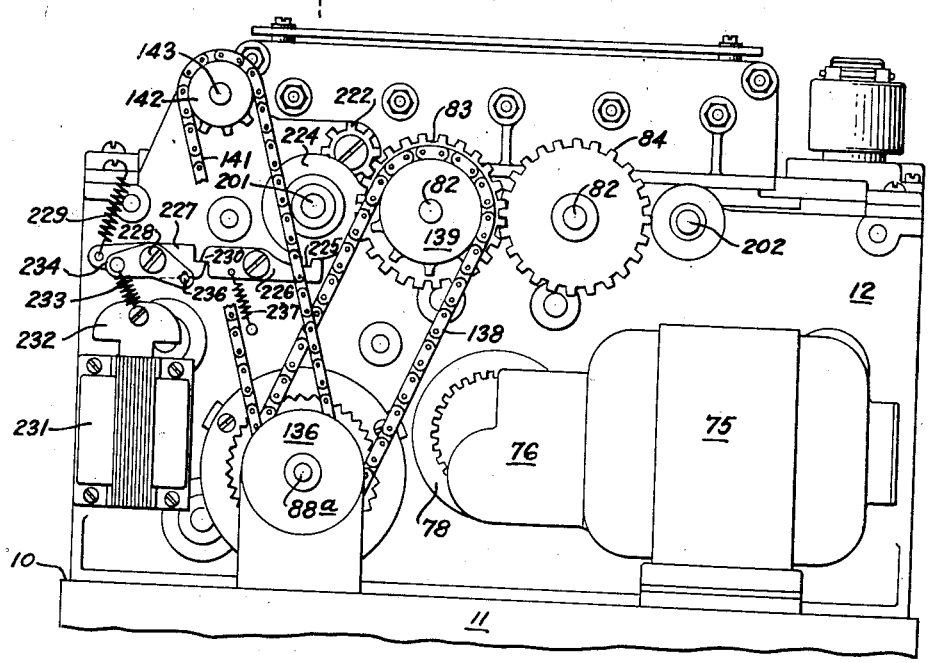
Fig. 5 is a front elevation of the same.

Rotation of the shaft 63a is transmitted step by step to a stub shaft 88a which corresponds in function to the stub shafts 88 heretofore described, but which is positioned forwardly of the front plate 12 of the machine, as illustrated in Fig. 5. This step by step rotation of the stub shaft 88a is imparted through a clutch mechanism generally indicated at 136 in Fig. 3, which is identical with the clutch mechanism shown in Figs. 15 and 16. The driving member of this clutch carries a sprocket 137 which is continuously rotated by a chain 138 (see Fig. 5) trained over a sprocket 139 on the forward end of one of the main drive shafts 82. The driven end of the clutch 136 carries a sprocket 140 which, through a chain 141, drives a sprocket 142 on a shaft 143 which, as best shown in Fig. 1, extends toward the rear of the machine, and, through a sprocket 144, chain 145, and sprocket 146, serves to drive a large gear 147 fixed to the last named sprocket and meshing with a small gear 148 which is fixed with respect to a differential housing 149, best illustrated in Figs. 8, 9 and 10. The differential gearing in this housing 149 imparts motion directly to the tens order of the counting mechanism at the same time that the tens order is receiving motion from the units order, as will be described under the detailed description of that mechanism.

*Counting mechanism*

Extending upwardly from the platform 14 are a pair of elongated bearing plates 150 and 151 (see Figs. 1 and 3) which are disposed transversely of the machine and between which are supported shafts 154 to 158 (see Figs. 2 and 11), the forward ends of which shafts support numbered dials 159 of a counter, each dial representing one order of the counter. For example, the shaft 154 supports the dial for the units order, the shaft 155 the dial for the tens order, etc. The shaft 98 which, as previously stated, transmits motion to the units dial of the counting mechanism is supported between the elongated bearing bracket 150 and a similar bearing bracket 160 disposed rearwardly thereof and carries at its forward end a gear 161 (see Figs. 1, 2 and 11) which meshes with and drives a gear 162 which is supported by but is freely rotatable on the units shaft 154. This gear 162, as best illustrated in Fig. 8, is secured to a forwardly projecting sleeve 163 which carries at its forward end a ratchet 164 engageable upon forward rotation with a spring-pressed pawl 165 carried on a Geneva drive wheel 166 which is fixed to and rotates the units shaft 154.

Upon forward movement of the sleeve 163 the Geneva drive wheel 166 is consequently rotated through the medium of the pawl 165, and this drive wheel carries a conventional Geneva pin 167 which, upon each complete rotation of the drive wheel and of the units order of the counting mechanism, engages with one of ten equally spaced notches in the periphery of a Geneva driven wheel 168 opposite the tens order. A Geneva drive wheel 169 (see Fig. 1) is also carried by the tens order shaft and for each complete rotation of the shaft transmits one-tenth of a rotation to the hundreds order through a Geneva driven wheel 170 on the hundreds shaft.

Similarly, movement is imparted to the higher orders of the counting mechanism by a Geneva drive wheel 171 on the hundreds shaft, driven wheel 172 and driving wheel 173 on the thousands shaft, and driven wheel 174 on the shaft of the ten thousands order of the counting mechanism. In each case a pawl and ratchet mechanism, similar to that shown at 165, serves to advance the counting mechanism upon forward rotation of the shaft in the tens order, but to permit the counting mechanisms to be set to zero without disturbing the position of the mechanism which drives them.

While the construction of the Geneva mechanisms for transmitting motion from each order of the counting mechanism to the next higher order is more or less conventional, the transmission of movement from the units order to the tens order varies from the conventional and permits the sale of ten-dollar tickets being registered directly on the tens order of the counting mechanism, even at the same time that movement is being transmitted from the units order to the tens order.

As shown in Fig. 8, rotation of the Geneva driven wheel 168 of the tens order is not imparted directly to the shaft 155 but to a sleeve 175 which is rotatable on said shaft and which carries a bevel gear 176 at its end, which gear is included in the differential gearing 149 previously referred to. An opposed bevel gear 177 is carried by the shaft 155 and a pair of pinion gears 178 carried by the differential housing are disposed between and in mesh with the bevel gears 176 and 177. It will be recalled that the gear 148 which is rotated upon reception of impulses by the machine from the sale of ten-dollar tickets is keyed to the housing of the differential 149. The bevel gear 177 is connected to the shaft 155 by the ratchet mechanism illustrated in Figs. 9 and 10, which will presently be described in detail, and the purpose of which is to cause rotation of the gear in a forward direction to impart rotation to the shaft and consequently to the tens order of the counting mechanism but to permit the shaft to be rotated independently of the gear for the purpose of zeroizing. Now, when the Geneva wheel 168 is driven, the differential housing 149 being stationary, the bevel gear 176 rotates the bevel pinions 178 and consequently drives the bevel gear 177 and the shaft 155 to advance the dial of the tens order. This occurs throughout one-tenth of a revolution for each complete revolution of the units order of the counting mechanism. If, meanwhile, an impulse has been received from the sale of a ten-dollar ticket, the gear 148 is driven through the mechanism heretofore described and imparts rotation to the differential housing in a direction opposite to that of the Geneva disc 168 and the bevel gear 176. As the housing carries the bevel pinions 178, and as these pinions revolve and mesh with the bevel gear 176, they impart forward rotation to the bevel gear 177. Reverse rotation of the housing 149 is at all times prevented by a ratchet 149a secured thereto and a pawl 149b. This movement of the gear 177 and shaft 155 may be independent of rotation of the gear 176 or, each occurring at the same time, the resultant rotation of the shaft 155 will be equivalent to the total motion received from the two separate sources and consequently the sale of ten-dollar bets may be registered directly in the tens order of the counting mechanism at the same time that the sale of two-dollar and five dollar bets, originally registered in the units order of the mechanism, are being transferred to the tens order.

As illustrated in Figs. 9 and 10, the ratchet mechanism by means of which the bevel gear 177 is connected to the shaft 155, is contained by a forwardly extending hub 180 formed integrally with the bevel gear and carrying a pair of pawls 181 pivoted on pins 182 and urged by springs 183 into engagement with ratchet teeth 184 which are formed directly on the surface of the shaft 155, thus permitting the shaft to be rotated independently for zeroizing in the same manner as the pawl 165 permits reverse rotation of the shaft 154 of the units order.

The construction of the counter dials 159, which are arranged at the forward ends of the shafts 154 to 158, inclusive, is illustrated in detail in Fig. 8, wherein one of the dials 159 is shown in section to be drum-shaped and to be secured to the reduced forward end of the shaft 55 by a collar 185 and a nut 186 which is threaded to the end of the shaft. The collar 185 is riveted to the drum 159, and a pin 187 passes through the shaft and through slots formed in the inner end of the collar in order to insure against its rotation on the shaft. At its forward end the collar is flanged outwardly to form an annular toothed clutch member 188, the outer periphery of which serves as a support for a contact ring 189 which is embraced on three sides by dielectric material such as "Bakelite," or the like, shown at 190. Brushes 191 (see Fig. 12) connected to a common conductor 192, engage the contact rings 189 of all the counter dials. A resilient contact arm 193, carried by each of the dials, is connected with the contact ring 189 and carries a contact point 194 at its outer end so that upon rotation of the dial the contact point 194 is carried with it and will be positioned to select a circuit in an electrical transmitter corresponding to the reading on the dial by which it is carried.

Transmitter mechanism

The units which effect selection and transmission of the circuits corresponding to the dial readings of the counter are mounted on a carriage 200 (see Figs. 1, 3 and 12) which is supported for sliding movement to and away from the counter dials on shafts 201 and 202. These units upon sliding toward the counter dials engage with the contact member 194 carried by the dials and, as the position of this contact member on each dial is controlled by the position of the dial, it selects a circuit in the unit which may be employed to transmit electrical energy to an electrical fieldboard or the like where the numbers on the dials may be reproduced in large electric lights.

As the dials may, in operation of the machine, be rotating at a high rate of speed, and as it is desirable to take a reading to be transmitted electrically without interrupting their rotation, the transmitter units are, according to the present invention, also rotatable so that they may be brought into contact with the dials simultaneously and rotate therewith while the reading is being transmitted. These transmitter units, as shown in Figs. 1, 3 and 8, comprise shafts 205 supported by double-row ball bearings 206 in bearing housings 207, all carried by a plate 208 arranged transversely of the carriage 200. These shafts are supported in the inner races of the ball bearings by nuts 209 threaded to the ends of the shafts and clamping the bearing race against collars 210 formed integrally with the shafts. Each of the shafts 205 carries a dielectric bushing 211, surrounded by alternate dielectric rings 212 and collector rings 213. An interiorly threaded bushing 214 is screwed on to the end of the shaft and acts to hold a dielectric collar 215 in place and also to secure all of the rings 212 and collectors 213 on the shaft. At its outer end, the bushing 214 is enlarged to provide an annular toothed clutch member 216 in position for registry with the clutch member 188 carried by the counter dial. Consequently, when the carriage 200, which supports the transmitter units, is in its normal position adjacent the counter dials, the clutch members 216 and 188 are in engagement, as illustrated in Fig. 8, and the entire transmitter unit is rotated with the dial and continues to rotate therewith as though it were locked thereto, until the carriage 200 is shifted away from the dials.

The collar 215 of the collector unit carries ten equally spaced contact members 217, any one of which may engage the contact member 194 to complete a circuit from the counter dial through the transmitter unit, and these members 217 extend through the collar to provide binding posts for the reception of wires 218 which extend one from each of the binding posts to one of the collector rings 213, of which there are ten. Engaging each of the collector rings is a brush 219, these brushes being arranged alternately on opposite sides of the transmitter unit, as indicated in Fig. 1, and extending downwardly to be supported on a dielectric plate 220 beneath which are wires leading from the individual brushes to sets of binding posts 221, there being one such binding post for each brush on all the transmitter units.

Now assuming that the counter dial is in its zero position, the contact member 194 carried thereby will also be in zero position, and if the transmitter unit is in zero position and is brought into engagement with the contact member 194, a circuit will be transmitted through the contact member 217 and through the respective collector ring 213 and eventually to the binding post 221 which is included in the zero circuit so that this circuit may be used to energize a zero in a panel on a fieldboard or the like corresponding to the same dial of the counter unit.

Now if before the transmitter unit was brought into contact with the dial, the dial had been rotated through five digits, the position of its contact member 194 would have been changed, and instead of closing the zero circuit through the transmitter unit, it would close the circuit for the digit "5." As this is an entirely separate circuit, it may be used to produce a "5" on the fieldboard rather than the zero. Correspondingly, any digit from zero to nine may be transmitted from the dial through the transmitter unit which, while being held against the dial, rotates with it by reason of being clutched thereto by the clutch members 186 and 216 and the arrangement of collector rings above described, permits a continuous transmission of this circuit as long as the dials and transmitters are clutched together.

It is desirable in race track practice to flash a reading on the fieldboard at frequent intervals, usually about every ninety seconds. In order to accomplish this, the transmitter units are at these intervals moved out of engagement with the dials, which continue their usual operation without interruption. The transmitter units are then set to zero and returned to engagement with the dials, whereupon they pick up a new reading of the dials which, in spite of the speed of operation of the dials, will be accurate as of the instant that the transmitters are brought into engagement. The mechanism for effecting this retraction of the transmitters is shown in Figs. 1, 3 and 5. As illustrated in these figures, the shafts 201 and 202 which support the carriage 200 are adapted to be rotated by one of the main drive shafts 82 through a gear 222 (see Figs. 1 and 5) which meshes with and imparts a continuous drive to a gear 223 which idles with respect to the shaft 201 but which is secured to the driving part of a single cycle clutch 224, which clutch, when engaged, connects the shaft 201 with the gear 223 so that it will be driven thereby.

The internal construction of the clutch 224 is similar to that of the clutch shown in Figs. 15 and 16, except that the clutch control finger extends radially outwardly as indicated at 225 in Fig. 5. A pivoted finger 226 normally engages the control finger 225 and prevents driving engagement of the clutch. A trip lever 227 has a sliding pivotal engagement on a pin 228 (see also Fig. 13) and is normally held by a spring 229 with its end engaged beneath a cam-like projection 230 on the rear end of the finger 226. A solenoid 231 with a retractable armature 232 is connected by a spring 233 with a lever 234 which pivots on the pin 228 and which also carries a pin 236 at its end, engageable beneath the lever 227. Energization of the armature 231, therefore, rocks the lever 234 and, through its pin 236, swings the inner end of the lever 227 upwardly to pivot and release the finger 226 from its engagement with the clutch control finger 225, thus permitting the clutch to engage and drive the shaft 201 through one complete revolution.

A spring 237 returns the finger 226 to its clutch controlling position immediately to prevent more than a single cycle of operation, regardless of whether the solenoid may be energized for a period of time exceeding that required for such cycle of operation. As the finger 226 returns under influence of the spring before the lever 227 returns to its normal position, the cam-like projection 230 rides over the end of the lever 227 and moves it out of the way by virtue of its sliding support on the pin 228.

This rotation of the shaft 201 imparts like rotation to the shaft 202 through the medium of a chain 240 (Fig. 1) carried by sprockets 241 and 242 on the shafts 201 and 202. Either of these shafts, and preferably both of them, is provided with a collar 243 (see Fig. 3) fixed to the shaft and having a notch 244 within which fits a cam finger 245 projecting laterally from the end of the carriage 200. When the shafts 201 and 202 rotate once through the mechanism just described, the angularly disposed edge of the notch 244 engages the cam-like edge of the finger 245 and ejects the finger from the notch and consequently slides the entire carriage 200 forwardly on the shafts 201 and 202 against the pressure of springs 246 (see Fig. 1) which surround said shafts and which normally urge the carriage to the rear. This forward movement of the carriage 200 effects separation of the clutch members 188 and 216 so that the transmitter units carried by the carriage are dissociated from the counter dials and may be re-set to zero without interfering with the continued operation of the counter dials. In order to insure against interference with the operation of the dials for the instant during retraction, the cam surfaces in the notch 244 and finger 245 are formed at the same angle as that of the clutch teeth on the clutch members 188 and 216, so that as the clutch members are drawn apart, they slide away from each other without any tendency to advance the counter dials. This same single rotation of the shafts 201 and 202 which effects retraction of the transmitter carriage also functions to zeroize the transmitter units so that, upon re-engagement with the counter dials, they take a reading through the electric circuits hereinbefore described which corresponds to the variation of the counter dials from their zero position or, in other words, a reading which corresponds with the reading of the counter dials themselves.

The transmitter zeroizing mechanism is positioned forwardly of the transmitter units, as shown in Figs. 1 and 13, and comprises collars 250 secured one to each of the shafts 205 for rotation therewith. At their rearward ends the collars 250 carry discs 251, each provided with a single peripheral notch within which engages a spring finger 252 to centralize the transmitter shafts on their zero positions, but, through the resiliency of the fingers 252 to permit rotation of said shafts away from their zero positions while they are clutched to and following the counter dials in order to maintain continuous electric circuits with said dials. On the forward end of each of the collars 250 there is a single notch ratchet disc 253 adapted to be engaged by a spring pressed pawl 254 pivotally supported on a pawl disc 255, which disc is secured to a hub which is common to a sprocket 256, this hub being rotatable with relation to the shaft 205. A chain 257 is trained over all of the sprockets 256, as well as over a pair of idler sprockets 258 and a driving sprocket 259 secured to and rotatable by the shaft 201. Consequently, the same rotation of this shaft 201 which takes part in dissociating the transmitters from the counter dials rotates the sprocket 259 and, through the chain 257, rotates all of the sprockets 256 through one cycle. The sprockets 256 carry with them the pawl discs 255, the pawls 254 of which engage the notches in the single notch ratchet discs 253 and, as these discs are secured relative to the shafts 205, each of the shafts and the transmitter unit carried by it, is carried to its zero position, it being understood that the position of the notch in the ratchet disc 253 corresponds to the zero position of the transmitter unit and the dwell positions of the pawls 254 also correspond to zero on the transmitters.

It is also necessary on occasion to zeroize the counter dials as, for example, at the beginning of each race when the totalizer is being used in connection with ticket printing and issuing machines. For this purpose, the shafts 154 to 158 of the counter dials are provided with ratchet discs 260 (see Fig. 1), pawl discs 261, and sprockets not shown, over which is trained a chain 262, all identical in structure with the same parts on the zeroizing mechanism of the transmitters. In this case, the chain 262 through these ratchet mechanisms effects zeroizing of the counter dials, it being recalled that these dials are driven through one-way ratchets 165, as described in connection with the counter operating mechanism. The sprocket which drives the chain 262 for zeroizing the counter dials is shown at 263 in Fig. 3, and is carried by a stub shaft 264 which is supported for rotation in alignment with the shaft 201. Splined to the stub shaft 264 for sliding movement thereon and for rotation therewith is a clutch collar 265 (see Figs. 3 and 14). This collar 265 has a dog 266 projecting forwardly therefrom for engagement with a peripheral notch 267 in a clutch part 268 fixed to the end of the shaft 201. Through this clutch mechanism the stub shaft 264 may be clutched to the shafts 201 so that upon rotation of the shaft 201, the stub shaft 264 will also rotate and zeroize the counter dials.

In order to effect engagement of the clutch collar 265 with its part 268, a lever 269, pivoted to the platform 14 as by a screw 270, carries a pin 271 in its outer end engageable with an annular groove 272 in the collar 265. A solenoid 273 has a right-angular armature 274 pivoted at 275, the downwardly projecting portion of which engages a groove 276 in the outer end of the lever 269. Upon energization of this solenoid, which is effected by closing of an electric circuit including identical solenoids in a number of totalizing machines, its armature 274 is swung to effect pivotal movement of the lever 269, which imparts forward movement to the clutch collar 265 clutching the stub shaft 264 to the shaft 201 so that it will be rotated thereby. A spring 277 connected with the lever 269 tends to draw the clutch collar out of its engagement with the clutch part 268, but, in order to prevent such withdrawal before the stub shaft has completed a full revolution, even though the solenoid has been de-energized, the collar 272 is provided with a rearwardly extending dog 278 which engages in its dwell position in a notch 279 formed in a stationary plate 280 which is secured to the platform 14.

An important feature of the zeroizing mechanism for the counter dials just described is that it also effects rotation of the driving discs of the Geneva drive of the counter mechanism. As the Geneva drive wheels 166, 169, 171 and 173 are carried by the counter wheel shafts which are zeroized, they too are returned to zero positions or, in other words, to such positions that upon further counting operation of the shafts each Geneva drive wheel will be set to transmit motion to the next higher order of the counting mechanism at the proper time.

At any time that it is desired to zeroize the counter dials, it is also desired to zeroize the transmitter units, and furthermore, it is necessary, through the driving mechanism just described, that the transmiter zeroizers be operated in order to impart power through their driving shaft 201 to the mechanism for zeroizing the counter dials. Means are provided, therefore, to close a circuit to the transmitter zeroizing solenoid 231 whenever the counter zeroizing solenoid 273 is actuated. This means comprises a switch bar 285 carried by the armature of the solenoid 273 and adapted, upon energization of said solenoid, to close contact points 286 which are included in, and upon being closed complete, a circuit which energizes the solenoid 231.

Having thus described our invention, what we claim and desire to secure by Letters Patent is—

1. In a machine for totalizing impulses initiated by operation of other machines, an impulse storing mechanism comprising a rotary member adapted to be advanced step by step upon occurrence of irregularly timed impulses, a second rotary member advanceable step by step at regular timed intervals, means carried by the first named rotary member to limit advancement of the second rotary member to the number of steps that the first has advanced, a counting mechanism, and means for registering the steps of the second rotary member on the counting mechanism.

2. In a totalizing machine for receiving and counting impulses initiated by operation of other machines, counting mechanism, and means for receiving impulses at random timing and transmitting them to the counting mechanism at regularly timed intervals, said means comprising a rotary impulse receiver, a rotary impulse transmitter, and means to limit operation of the transmitter to the number of previous operations of the receiver.

3. In a totalizing machine for receiving and counting impulses initiated by operation of other machines, counting mechanism, and means for receiving impulses at random timing and transmitting them to the counting mechanism at regularly timed intervals, said means comprising a constantly rotating sun gear, planet gears meshing therewith, a ring gear meshing with the planet gears, an escapement normally preventing the planet gears from revolving about the sun gear whereby they will drive the ring gear to provide a constant torque, and impulse controlled means for actuating the escapement to release the planet gears for step by step revolving movement.

4. In a machine for totalizing impulses initiated by operation of other machines, a counting mechanism, motor driven means for actuating the counting mechanism including a single clutch, means normally holding the clutch in disengaged position, and impulse controlled mechanism for causing the clutch to engage and advance the counting mechanism for distances corresponding to the number and value of the impulses received.

5. In a machine for totalizing impulses initiated by operation of other machines, a counting mechanism, motor driven means for actuating the counting mechanism including a clutch, means normally holding the clutch in disengaged position, and impulse controlled mechanism for moving the clutch holding means in steps to permit engagement of the clutch for periods corresponding to impulses received by the machine.

6. In a machine for totalizing impulses initiated by operation of other machines, a counting mechanism, motor driven means for actuating the counting mechanism including a clutch, a ratchet stop device for holding the clutch in disengaged position, and mechanism controlled by impulses received by the machine for advancing said stop device to permit engagement of the clutch for periods determined by the number and source of the impulses.

7. In a machine for totalizing the value of impulses representing different values and initiated by operation of other machines, separate means to receive and store impulses of different values, a counting mechanism, means to transmit impulses from the storing mechanisms to the counting mechanisms, said last means including a rotary member carrying cams for imparting movement to the counting mechanism, said cams varying in size to advance the counting mechanism distances depending upon the value of the impulses stored.

8. In a totalizing machine, an impulse storing mechanism which comprises a first escapement wheel and a second escapement wheel, means normally tending to rotate both said wheels, an escapement lever actuated by impulses to permit advance of the first escapement wheel, a second escapement lever actuated at regular intervals to permit advance of the second escapement wheel, and means limiting the advance of the second wheel to correspond to that of the first wheel.

9. In a totalizing machine, an impulse storing mechanism which comprises a first escapement wheel and a second escapement wheel, means including epicyclic gear trains normally tending to rotate both said wheels, an escapement lever actuated by impulses to permit advance of the first escapement wheel, a second escapement lever actuated at regular intervals to permit advance of the second escapement wheel, and means limiting the advance of the second wheel to correspond to that of the first wheel.

10. In a totalizing machine, an impulse storing mechanism which comprises a first escapement wheel and a second escapement wheel, means normally tending to rotate both said wheels, an escapement lever actuated by impulses to permit advance of the first escapement wheel, a second escapement lever actuated at regular intervals to permit advance of the second escapement wheel, means limiting the advance of the second wheel to correspond to that of the first wheel, and means controlled by movements of the second wheel to impart movement to a counting mechanism.

11. In a totalizing machine, a plurality of impulse storing mechanisms, means for releasing impulses therefrom at regular intervals, a constantly rotating member carrying a cam for each storing mechanism, the height of each cam corresponding to the value of impulses stored by its associated storing mechanism, a lever moved by each cam, a counting mechanism, and means effective upon release of an impulse from any storing mechanism to effect connection of said lever with the counting mechanism whereby the counting mechanism will be advanced a distance corresponding to the value of the impulse.

12. In a totalizing machine, the combination with impulse storing and releasing mechanisms and a counting mechanism of a clutch comprising a clutch control finger movable in a circular path, a pawl normally intercepting said finger to hold the clutch in disengaged position, a ratchet ring concentric with said annular path, and means actuated upon release of impulses to advance the pawl over the ratchet ring and to permit engagement of the clutch for periods corresponding to the impulses released.

THOMAS A. KEEN.
JAMES KILBURG.